Dec. 12, 1961  M. E. BOURNS  3,013,236
PRESSURE RESPONSIVE ELECTRICAL INSTRUMENT
Original Filed June 14, 1956
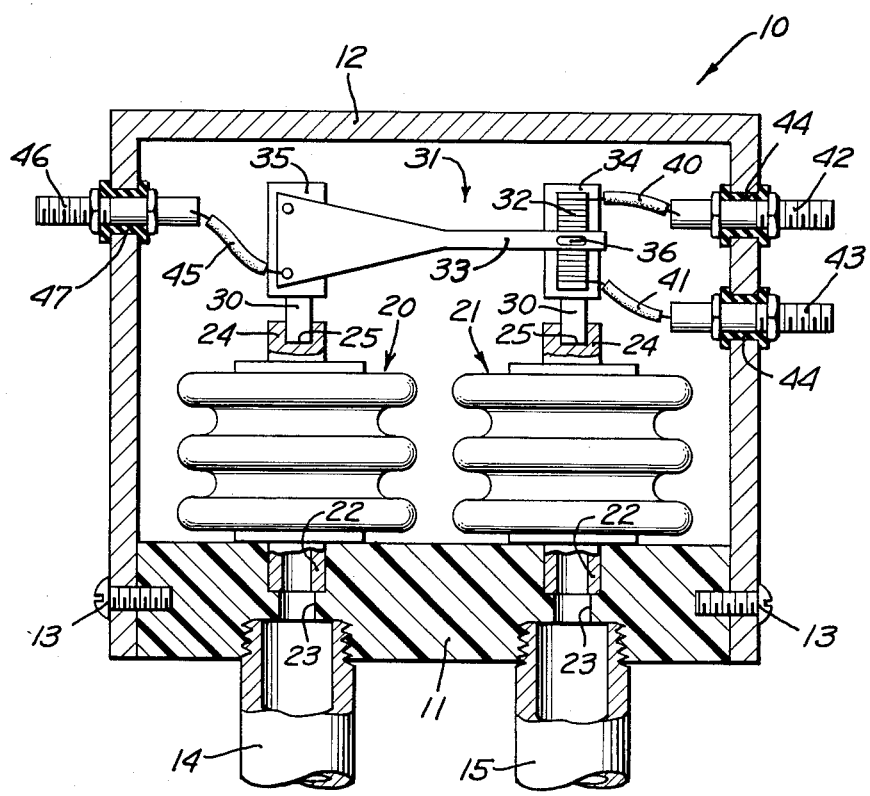
INVENTOR.
MARLAN E. BOURNS
BY
Herbert E. Kidder
AGENT United States Patent Office 3,013,236
Patented Dec. 12, 1961

3,013,236
PRESSURE RESPONSIVE ELECTRICAL INSTRUMENT
Marlan E. Bourns, 2482 Carlton Place, Riverside, Calif.
Continuation of application Ser. No. 591,370, June 14, 1956. This application Apr. 11, 1960, Ser. No. 21,254
4 Claims. (Cl. 338—41)

The present invention relates to pressure responsive electrical instrument, and is a continuation of my pending application, Serial No. 591,370, filed June 14, 1956, now Patent No. 2,932,807, entitled Pressure Responsive Electrical Instruments.

More specifically, the present invention relates to differential pressure transducers of the type embodying an electrical signal means, such as a variable resistor or potentiometer, for measuring fluid pressure against either a vacuum, atmospheric pressure, or a second fluid pressure as the reference.

The primary object of the present invention is to provide a sensitive pressure transducer which is relatively immune to the effects of shock, vibration, and acceleration. This is an important advantage, inasmuch as pressure transducers of this type are frequently exposed to severe conditions of vibration and acceleration, while being called upon and deliver accurate pressure response, free of vibration and acceleration error.

Another object of the invention is to provide a pressure transducer of the type described, wherein the electrical output is not affected by temperature changes.

Still a further object of the invention is to provide a differential pressure responsive instrument which is simple and inexpensive to manufacture, while at the same time rugged in construction and having an extremely sensitive and accurate response to fluid pressure conditions.

These and other objects and advantages of the present invention will become apparent to those skilled in the art upon consideration of the following detailed description of the preferred embodiment thereof, reference being had to the accompanying drawing, which is a cross sectional view taken through an instrument embodying the principles of the invention.

In the drawing, the pressure transducer is designated in its entirety by the reference numeral 10, and includes a housing consisting of a base 11 and cover 12. The base 11 is preferably formed of dielectric material such as plastic, ceramic, or the like, and the cover 12 is a metal cup extending down over the edges of the base 11 and secured thereto by screws 13. Screwed into tapped holes in the bottom of the base 11 are two threaded pipes 14 and 15, which are connected to sources of fluid pressure (not shown).

Mounted side by side within the housing and parallel to one another, are two thin-walled, pressure sensitive bellows 20 and 21, each of which is secured at one end thereof by a tubular bushing 22 to the base 11. The tubular bushings 22 are secured within holes in the base 11, and the central bore of the bushing opens into the interior of its respective bellows. The bottom end of the tubular bushing 22 opens into a short passageway 23 which connects into the associated pipe 14, 15, and the said pipes are thus connected to the interior of the bellows so that fluid pressure can be admitted thereto.

The top ends of the bellows 20, 21 are movable up and down responsive to changes in the pressure differential between the inside and outside of the bellows. Secured to the movable end of each of the bellows is an upwardly projecting stud 24, having a socket 25 in its upper end to receive the shank 30 of one of two relatively movable parts comprising the electrical signal means 31.

The signal means 31 may take any desired form, but in the illustrated embodiment is shown as a potentiometer consisting of a resistance element 32 and wiper contact 33. The resistance element 32 is mounted on the movable end of the bellows 21 and is elongated in configuration, with its lengthwise dimension, or longitudinal axis, extending parallel to the line of travel of the free end of the bellows. The element 32 may take any desired form, but is here shown as a wire-wound type of element, which is secured to a support 34. The support 34 is carried at the top end of the shank 30, which is mounted on the movable end of the bellows 21.

The wiper contact 33 is mounted on the movable end of the bellows 20, and is secured thereto by a support 35. The support 35 is mounted on the top end of the shank 30, which is attached to the stud 24 on the movable end of bellows 20. The contact 33 is preferably formed of resilient sheet metal, and is in the form of a long slender finger with a flared root portion which is attached to the support 35. The contact 33 projects laterally from the support 35 over the exposed surface of the resistance element 32. A narrow ridge 36 on the end of the contact 33 wipes on the element 32 to make electrical contact therewith, and as the movable end of the bellows 20 travels up and down responsive to changes in pressure differential, the contact ridge 36 wipes on the element 32 from one end thereof to the other.

Wires 40 and 41 connect the ends of the resistance element 32 to terminals 42 and 43, respectively; the said terminals extending through holes in the cover 12 and being insulated therefrom by rubber grommets 44. Contact member 33 is likewise connected by a wire 45 to a third terminal 46, which extends through a hole in the cover 12 and is insulated therefrom by a rubber grommet 47.

The two bellows 20 and 21 are preferably substantially identical in construction, and have substantially the same spring constant. Thus, any vibration or acceleration forces applied to the instrument cause the element 32 and contact 33 to move up and down together in synchronism. The electrical signal means is thus substantially unaffected by the effects of vibration or acceleration. Also, since both of the bellows 20 and 21 are exposed to the same temperature conditions, any change in the position of the contact 33 due to thermal effects is counteracted by a corresponding change in the position of the resistance element. The instrument is thus relatively unaffected by temperature changes.

The operation of the present invention is believed to be more or less clear from the foregoing description and the drawing. Fluid pressure may be introduced into either of the bellows 20 or 21 through pipes 14 or 15. The other bellows may be evacuated and sealed, or opened to atmospheric pressure, or filled with gas or fluid at any desired pressure, depending upon the desired reference pressure. The movable end of the bellows into which fluid pressure is admitted rises or falls with changes in the pressure differential between the inside and outside of the bellows. This causes the contact member 33 and element 32 to be displaced with respect to one another in the vertical direction, so that the contact 33 is shifted along the length of the element. In the usual method of operation, voltage is applied across the end of the resistance element 32, and the position of the wiper 33 along the length of the element is accurately shown by the voltage across terminal 46 and either of the terminals 42 or 43.

If it is desired to measure the difference between two different fluid pressures, the two pressures may be admitted to the interiors of both of the bellows 20, 21, respectively, in which case, both the element 32 and contact 33 will be displaced in the vertical direction, and the resultant shift of the contact 33 along the length of the element 32 will be a function of the difference in pressures.

While I have shown and described in considerable detail what I believe to be the preferred form of my invention, it will be understood by those skilled in the art that various changes may be made in the shape and arrangement of the several parts without departing from the broad scope of the invention, as defined in the appended claims.

I claim:

1. A differential pressure transducer comprising a housing, a pair of pressure sensitive bellows mounted on said housing, each of said bellows being independent of the other and having a free end movable in response to changes in the pressure differential between the inside and outside of said bellows, the free ends of said bellows moving in parallel paths, means for introducing two different fluid pressures from separate sources into said bellows, electrical signal means comprising a resistance element mounted on the movable end of one of said bellows, and a contact member connected to the movable end of the other of said bellows, and terminal means electrically connected to said resistance element and to said contact member.

2. A differential pressure transducer as defined in claim 1, wherein said two pressure sensitive bellows are substantially identical to one another and have substantially the same spring constant.

3. A differential pressure transducer comprising a housing having a base, a pair of pressure sensitive bellows disposed side by side and parallel to one another, each of said bellows being independent of the other and having a fixed end attached to said base and a free end movable in response to changes in the pressure differential between the inside and outside of said bellows, said free ends of said bellows moving in parallel paths, means for introducing two different fluid pressures from separate sources into said bellows, an elongated resistance element mounted on the free end of one of said bellows, the longitudinal axis of said resistance element being parallel to the line of travel of said free end of said one bellows, a resilient spring contact finger fixed to the free end of the other of said bellows and projecting laterally therefrom, said contact finger extending tranversely across said resistance element and wiping thereon, and terminal means electrically connected to said resistance element and to said contact finger.

4. A differential pressure transducer as defined in claim 3, wherein said two pressure sensitive bellows are substantially identical to one another and have substantially the same spring constant.

References Cited in the file of this patent

UNITED STATES PATENTS

| | | |
|---|---|---|
| 1,398,792 | Paulin | Nov. 29, 1921 |
| 2,542,717 | Smith | Feb. 20, 1951 |
| 2,622,177 | Klose | Dec. 16, 1952 |
| 2,889,527 | Statham | June 2, 1959 |